United States Patent Office 3,531,238
Patented Sept. 29, 1970

3,531,238
PROCESS FOR THE CONTINUOUS DYEING OR PRINTING WITH BASIC DYESTUFFS OF TEXTILE MATERIALS CONSISTING OF POLYACRYLONITRILE
Udo Hendricks, Cologne-Stammheim, Robert Kuth, Cologne-Muengersdorf, Werner Langmann, Cologne-Flittard, and Mathieu Quaedvlieg, Opladen, Germany, assignors to Farbenfabriken Bayer Aktiengesellschaft, Leverkusen, Germany, a corporation of Germany
No Drawing. Filed Feb. 28, 1967, Ser. No. 619,192
Claims priority, application Germany, Mar. 23, 1966,
F 48,733
Int. Cl. D06p 5/06
U.S. Cl. 8—172        9 Claims

ABSTRACT OF THE DISCLOSURE

A process for continuously dyeing or printing textile materials containing polyacrylonitrile with basic dyestuffs, wherein said textile materials are impregnated with a aqueous solution of a water soluble cyanoethylated polyol or cyanoethylated hydroxy methyl ether of a polyol, and thereafter thermally after-treating the material.

---

The object of the present invention comprises a process for the continuous dyeing or printing with basic dyestuffs of textile materials consisting of polyacrylonitrile; the process consists in impregnating the textile materials with an aqueous solution which contains water-soluble cyanoethylated polyols or cyanoethylated hydroxymethyl ethers of polyols and subsequently subjecting them to a thermal after-treatment.

Suitable water-soluble cyanoethylated polyols or cyanoethylated hydroxymethyl ethers of polyols are, for example, the products which obtained, when compounds containing at least two hydroxyl groups, such as glycol, glycerol, pentaerythritol, trihydroxy-neopentane, saccharose or sorbitol, or the hydroxymethyl ethers formed therefrom by the reaction with formaldehyde, paraformaldehyde or trioxan, are reacted in the presence of catalytic amounts of compounds of alkaline reaction, such as alkali metal oxides, hydroxides and carbonates, or quaternary ammonium salts, at temperatures of 20 to 100° C., with acrylonitrile, optionally in solvents, such as water, dimethyl formamide or dimethyl sulphoxide.

Especially suitable as starting components for the production of water-soluble cyanoethylated polyols or cyanoethylated hydroxymethyl ethers of polyols are polyols and hydroxymethyl ethers of polyols containing at least 4 hydroxyl groups, e.g. pentaerythritol, saccharose and sorbitol or the hydroxymethyl ethers formed therefrom by reaction with formaldehyde, paraformaldehyde or trioxan.

The basic dyestuffs which are used in the process according to the invention may belong to a great variety of groups. Suitable dyestuffs are, for example, diphenylmethane dyestuffs, triphenyl-methane dyestuffs, rhodamine dyestuffs, azo or anthraquinone dyestuffs containing onium groups, and also triazine, oxazine, methine and azomethine dyestuffs.

The proportion by weight between the basic dyestuffs and the cyanoethylated polyols or cyanoethylated hydroxymethyl ethers of polyols to be used according to the invention can easily be established by preliminary experiments. In general, about 20–200% of these products are used, referred to the weight of the basic dyestuffs.

The pH value of the liquor is expediently between 2.5 and 6.5. Furthermore, it is advisable to add a thickening agent to the impregnating liquor, for example, an etherified carob bean flour or British gum.

Impregnating can be carried out by padding, spraying, coating or printing, and the thermal after-treatment can be performed by steaming at 100° C. with neutral saturated steam for 2 to 3 minutes or by thermosolisation, i.e. by heating at temperatures of 180 to 200° C. for 20 to 90 seconds.

With the aid of the process according to the invention it is possible to dye or print a great variety of textile materials consisting of polyacrylonitrile, for example, cable sheathing, filaments, flocks, combed material, yarns, fabrics or knitted fabrics, with outstanding levelness and in deep shades. Textile materials consisting of polyacrylonitrile comprise in the present case also those materials for the production of which other acrylo and/or vinyl compounds have been used, besides acrylonitrile, such as vinyl chloride, vinylidene chloride, vinyl fluoride, vinyl acetate, vinyl chloroacetate, vinyl alcohol, acrylic acid ester, methacrylic acid ester or allyl chloroacetate, or also basic vinyl compounds, such as vinyl imidazole, vinyl pyridine, vinyl benzimidazole, vinyl pyrimidine and vinyl methyl pyridine, provided that the proportion of these compounds does not exceed 20%. The process can also be applied to mixed fibres or mixed spun yarns of such copolymers with other fibres, such as wool or polyamide.

A special method of carrying out the process of the present invention consists in that the liquor serving for impregnation contains carboxylic acid amides and/or surface-active polyglycol ethers, in addition to cyanoethylated polyols or cyanoethylated hydroxymethyl ethers of polyols. Examples of carboxylic acid amides are the amides of aliphatic carboxylic acids of low and high molecular weight, such as formic acid, acetic acid, lauric acid, stearic acid and oleic acid, and also the mono- or dialkylamides and the mono- or dialkanolamides of these acids; furthermore lactams, such as ε-caprolactam, pyrrolidone or polyvinyl-pyrrolidone, and urea or its alkyl derivatives; suitable surface-active polyglycol ethers are, for example, the reaction products of 6 to 20 mol ethylene oxide with 1 mol of a fatty alcohol, fatty amine, fatty acid, fatty acid amide or of an alkyl-phenol containing an aliphatic hydrocarbon radical with 9 to 18 carbon atoms.

The proportion by weight between the carboxylic acid amides and/or the surface-active polyglycol ethers, on the one hand, and the cyanoethylated polyols or cyanoethylated hydroxy-methyl ethers of polyols, on the other hand, expediently amounts to 1:1 to 1.5:1. By the addition of carboxylic acid amides or surface-active polyglycol ethers the depth and levelness of the dyeings can be further improved.

The parts given in the following examples are parts by weight.

EXAMPLE 1

Combed material of polyacrylonitrile is impregnated with an aqueous liquor which was prepared by adjusting a mixture of 30 parts of the dyestuff Colour Index, 2nd Edition, No. 48,015, 30 parts of the cyanoethylated glycerol described below, 10 parts glacial acetic acid, and 120 parts of a commercial thickening agent based on carob bean flour with a solids content of 5%, 1000 parts by the addition of water. The combed material is subsequently squeezed to a weight increase of 90%, treated with neutral saturated steam at 103° C. for 25 minutes, then rinsed with water and dried. The combed material is then dyed in a bright red shade.

The cyanoethylated glycerol used above was prepared as follows: 424 parts acrylonitrile were added dropwise at 40 to 50° C. to a mixture of 184 parts glycerol, 12 parts of a 45% sodium hydroxide solution and 1.8 parts hydroquinone. The reaction mixture was then stirred at 40 to 50° C. for 3 hours, adjusted to a pH value of 3 to 4 by means of hydrochloric acid, and then heated in a vacuum at 70 to 80° C. until the excess acrylonitrile and the water were removed. The residue after distillation was subsequently filtered.

EXAMPLE 2

The procedure described in Example 1 is followed, but with the use of a liquor containing, instead of the dyestuff there stated, 30 parts of the dyestuff Colour Index No. 48,020 and, instead of 30 parts of cyanoethylated glycerol, only 15 parts of this product and, in addition, a mixture of 5 parts oleic acid ethanolamide, 5 parts of the reaction product of 20 mol ethylene oxide with 1 mol oleyl alcohol, 2.5 parts of the reaction product of 7 mol ethylene oxide with 1 mol nonyl-phenol, and 5 parts urea. A red-violet dyeing of excellent levelness is obtained.

EXAMPLE 3

A fabric of polyacrylonitrile is impregnated on a foulard with an aqueous liquor which was prepared from 30 parts of the dyestuff Colour Index No. 51,005, 15 parts of the cyanoethylated methylol ether of pentaerythritol described below, 17.5 parts of the mixture described in Example 2, 10 parts sodium acetate and 120 parts of a commercial thickening agent. After squeezing to a wet weight increase of 81%, the fabric is treated with neutral saturated steam for 30 minutes, then rinsed with water and dried. The fabric is then dyed in a level blue shade; the dyeing has good fastness properties.

The cyanoethylated metyhlol ether of pentaerythritol used above was prepared as follows: a solution of 136 parts pentaerythritol in 250 parts of water was mixed at 60 to 70° C. with 5 parts of a 45% sodium hydroxide solution and 120 parts paraformaldehyde and stirred at 60 to 70° C. for 30 minutes. The reaction mixture was then treated dropwise with 233 parts acrylonitrile, stirred at 60 to 70° C. for a further 3 hours and then neutralized with hydrochloric acid. The water was subsequently distilled off in a vacuum.

EXAMPLE 4

A fabric of polyacrylonitrile is impregnated with a liquor prepared from 15 parts of the dyestuff Colour Index No. 42,025, 10 parts of the cyanoethylated methylol ether of saccharose described below, 10 parts of the mixture described in Example 2 and 10 parts of the sodium salt of chloroacetic acid. The fabric is then squeezed to a weight increase of 100%, then dried and finally heated at 190° C. for 30 seconds. A bright blue dyeing is obtained.

The cyanoethylated methylol ether of saccharose used above was prepared as follows: a solution prepared from 342 parts saccharose, 800 parts of a 30% formaldehyde solution and 15 parts of a 45% sodium hydroxide solution was mixed dropwise at 50–60° C. with 466 parts acrylonitrile and the mixture was stirred for a further 3 hours. The reaction mixture was then neutralised with hydochloric acid and the water distilled off in a vacuum at 70 to 80° C.

EXAMPLE 5

The procedure described in Example 1 is followed, but instead of the dyestuff there mentioned, there are used 20 parts of the dyestuff Colour Index No. 48,013 and instead of the cyanoethylated glycerol there mentioned, there are used 20 parts of the cyanoethylated saccharose described below. A brilliant red-violet dyeing is obtained.

The cyanoethylated saccharose used above was prepared as follows: a solution prepared from 410 parts saccharose, 1.6 parts sodium hydroxide and 600 parts of water was mixed dropwise at 60 to 70° C. with 382 parts acrylonitrile, the mixture was then stirred at 60 to 70° C. for a further 3 hours, then neutralised with hydrochloic acid and mixed with 600 parts of water. The lower phase which separated from the cloudy solution upon standing, was removed and from the clear aqueous upper phase the water was finally distilled off in a vacuum at 70 to 80° C.

EXAMPLE 6

A fabric of polyacrylonitrile is impregnated with an aqueous liquor prepared from 30 parts of the dyestuff Colour Index No. 48,040, 30 parts of the cyanoethylated saccharose described below, 120 parts of a commercial thickening agent based on carob bean flour with a solids content of 5%, and 820 parts of water. The fabric is subsequently squeezed to a wet weight increase of 100%, then heated to about 80° C. by continuously passing it through an infra-red heating zone according to the padroll dyeing process (system Rydboholm-Artos), then rolled up tensionless in a dyeing chamber where it is heated at 100° C. for 6 hours. The fabric is subsequently rinsed and dried. A brilliant orange dyeing of excellent fastness properties is obtained.

The cyanoethylated saccharose used above was prepared as follows: a solution of 342 parts saccharose and 1.3 parts sodium hydroxide in 500 parts of water was mixed dropwise at 50 to 60° C. with 468 parts acrylonitrile, the mixture was stirred at 50 to 60° C. for a further 2 hours, then neutralised with hydrochloric acid and allowed to stand at 50 to 60° C. for 3 hours. The cyanoethylated saccharose which had settled from the reaction mixture as lower phase was then separated from the upper aqueous phase, stirred at 40–50° C. with 200 parts of water and finally, after another separation from the aqueous phase, evaporated in a vacuum at 80–90° C. to give a colourless, highly viscous liquid.

EXAMPLE 7

Combed material of polyacrylonitrile is impregnated with a liquor consisting of 20 parts of the dyestuff Colour Index No. 42040, 30 parts of the cyanoethylated methylol ether of saccharose described below, 10 parts glacial acetic acid, 120 parts of the thickening agent used in Example 6 and 820 parts of water. Further treatment is carried out according to the instructions of Example 6. A deep green dyeing is obtained.

The cyanoethylated methylol ether of saccharose used above was prepared as follows: a solution prepared from 274 parts of a 45% sodium hydroxide solution and 250 parts of water was mixed first with 96 parts paraformaldehyde and then dropwise at 50 to 60° C. with 186 parts acrylonitrile. After stirring at 50 to 60° C. for 4 hours, the reaction mixture was neutralised with hydrochloric acid, freed from water in a vacuum at 70 to 80° C. and finally filtered.

We claim:

1. A process for continuously dyeing or printing textile materials containing polyacrylonitrile with a basic dyestuff, comprising impregnating the textile materials with an aqueous solution comprising the basic dyestuff and an active amount of an additive selected from the group consisting of a water-soluble cyanoethylated polyol selected from the group consisting of glycol, glycerol, pentaerythritol, trihydroxy-neopentane, saccharose and sorbitol or cyanoethylated hydroxy methyl ether of said polyol and subsequently subjecting the impregnated textile material to thermal after-treatment.

2. The process of claim 1 wherein the water-soluble cyanoethylated polyols and cyanoethylated hydroxymethyl ethers of polyols contain at least four hydroxyl groups.

3. The process of claim 1 wherein the aqueous solution additionally contains at least one of a carboxylic acid amide and a surface-active polyglycol ether.

4. The process of claim 1 wherein the ratio of basic dyestuff to polyol or ether additive in the solution is about 10:2–20 parts by weight.

5. The process of claim 1 wherein the thermal after treatment consists of steaming with neutral saturated steam or by thermosolisation.

6. The process of claim 1 wherein the textile materials contain at least 80% polyacrylonitrile.

7. A textile material containing polyacrylonitrile impregnated and treated according to the process of claim 1.

8. The process of claim 1 wherein the water soluble polyol or ether additive is obtained by reacting glycol, glycerol, pentaerythritol, trihydroxy-neopentane, saccharose or sorbitol or their corresponding hydroxymethyl ethers obtained by the reaction with formaldehyde or trioxane; with acrylonitrile in the presence of a catalytic amount of a member selected from the group consisting of an alkali metal oxide, alkali metal hydroxide, carbonate or quaternary ammonium salt; effecting the reaction at a temperature of about 20–100° C.

9. The process of claim 8 wherein the polyol or ether additive is obtained by reacting with acrylonitrile in the presence of a reaction solvent selected from the group consisting of water, dimethyl formamide or dimethyl sulphoxide.

References Cited

UNITED STATES PATENTS 2,939,759   6/1960   Scalera et al.
3,325,421   6/1967   Muller _____ 8—85 X GEORGE F. LESMES, Primary Examiner T. J. HERBERT, JR., Assistant Examiner U.S. Cl. X.R.

8—173, 177